No. 843,043. PATENTED FEB. 5, 1907.
J. SIGRIST.
SURFACE INDICATOR.
APPLICATION FILED JUNE 13, 1906.
2 SHEETS—SHEET 1.
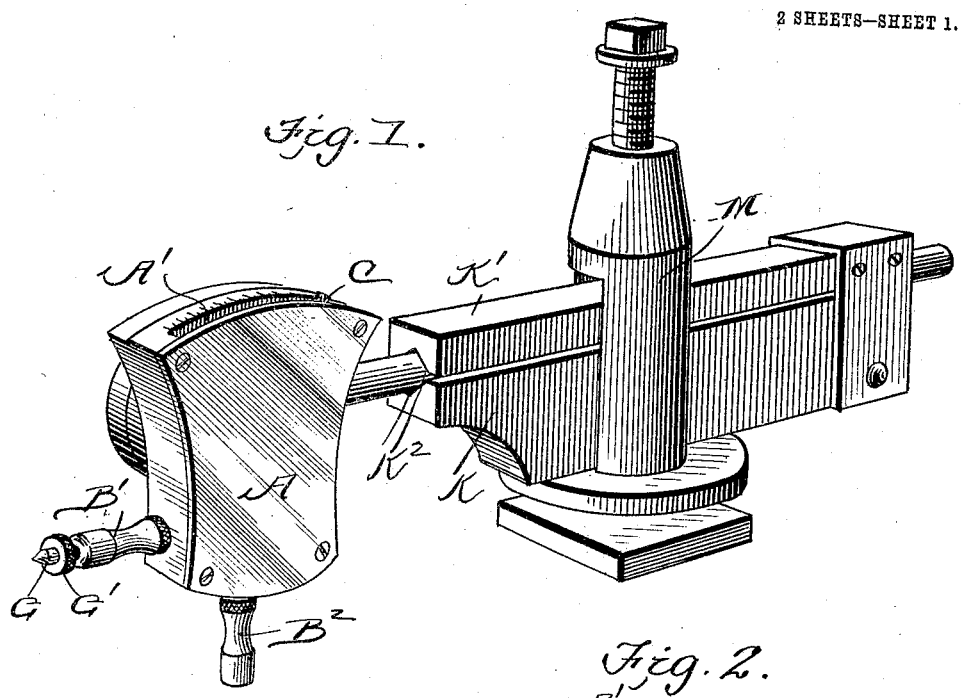
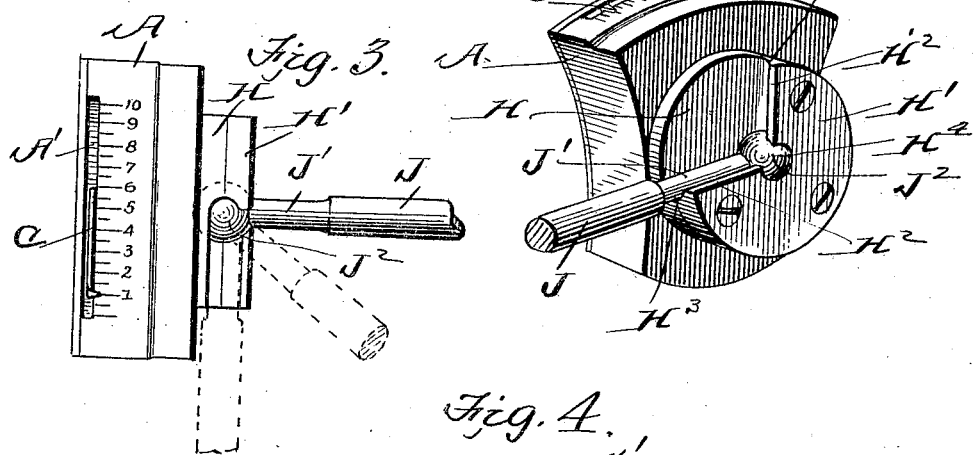
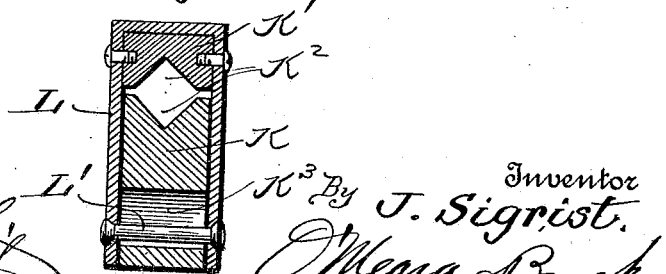
Witnesses
M. D. Blondel
E. B. McBath
Inventor
J. Sigrist.
By O'Meara Brock
Attorney No. 843,043. PATENTED FEB. 5, 1907.
J. SIGRIST.
SURFACE INDICATOR.
APPLICATION FILED JUNE 13, 1906.
2 SHEETS—SHEET 2.
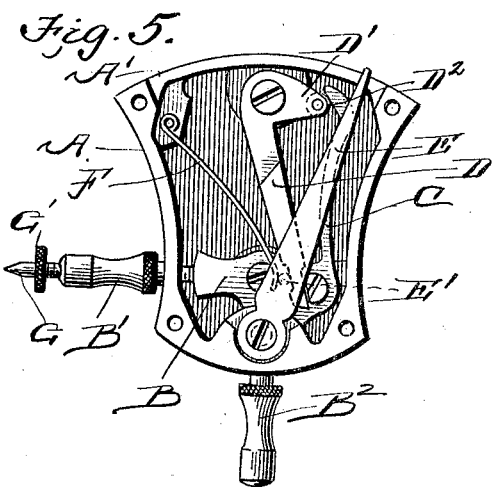
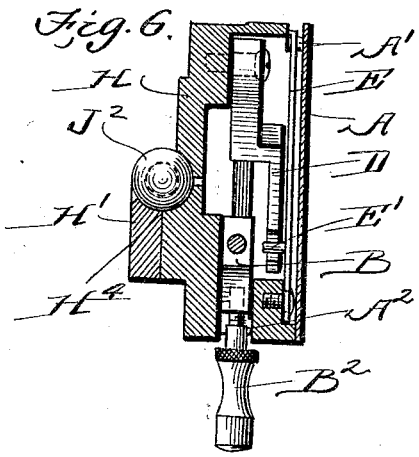
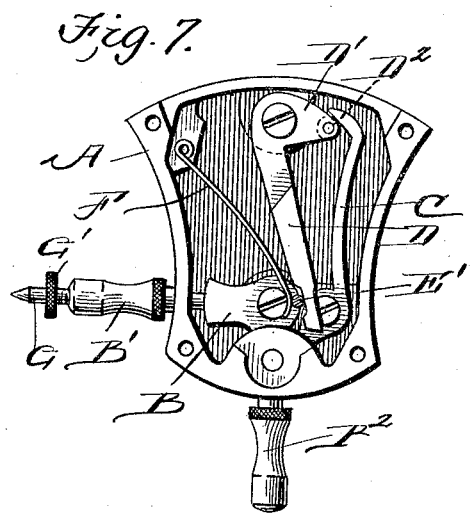
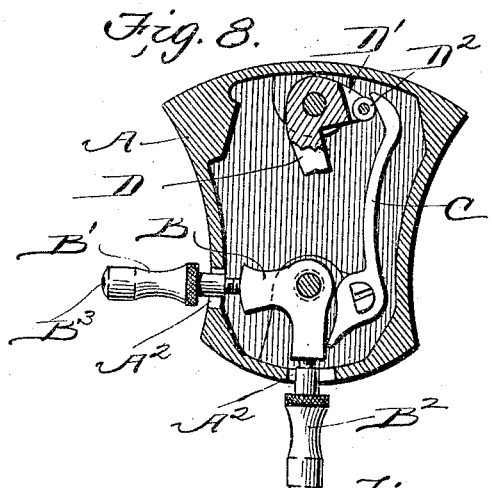
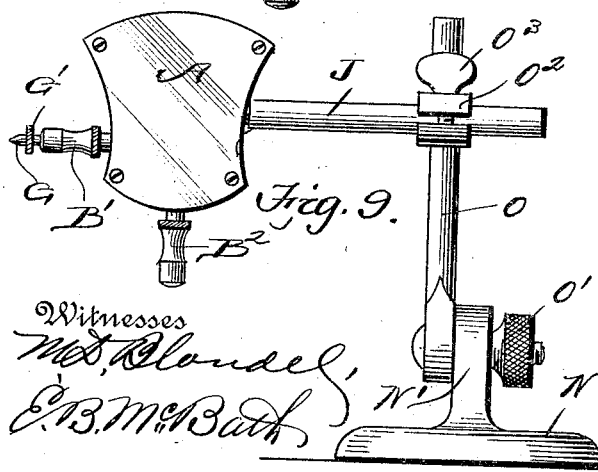
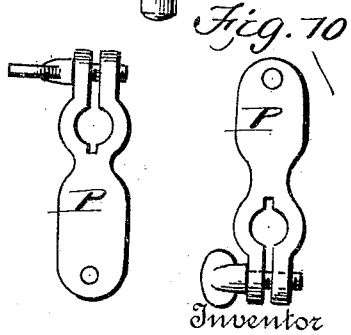
Witnesses
Inventor
J. Sigrist.
By O'Meara & Brock
Attorneys

UNITED STATES PATENT OFFICE.

JACOB SIGRIST, OF POUGHKEEPSIE, NEW YORK.

SURFACE-INDICATOR.

No. 843,043.

Specification of Letters Patent.

Patented Feb. 5, 1907.

Application filed June 13, 1906. Serial No. 321,506.

*To all whom it may concern:*

Be it known that I, JACOB SIGRIST, a citizen of the United States, residing at Poughkeepsie, in the county of Dutchess and State of New York, have invented a new and useful Improvement in Surface-Indicators, of which the following is a specification.

This invention relates to an improvement in surface-indicators; and the object of the invention is to detect any unevenness in a plane surface, and a further object of the invention is an indicator of this type which will indicate by means of an index-needle moving along a graduated scale the extent of the inequality, and the device can also be used in setting work on lathes, planers, shapers, milling-machines, drill-presses, or in erecting and testing machinery of any kind, truing shafts, &c.

The invention consists of the novel features of construction hereinafter described, pointed out in the claims, and shown in the accompanying drawings, in which—

Figure 1 is a perspective view of the invention as applied to the post of a lathe. Fig. 2 is a detail perspective view showing the rear side of the indicator. Fig. 3 is a top plan view of the indicator. Fig. 4 is a section taken transversely through a holder intended to receive a bar carried by the indicator. Fig. 5 is a front elevation of the indicator with the front face-plate removed. Fig. 6 is a central vertical section taken at right angles to the view taken in Fig. 5. Fig. 7 is a vertical elevation of the indicator with both the front plate and the index-needle removed. Fig. 8 is a vertical section through the indicator, taken at right angles to the section shown in Fig. 6. Fig. 9 is a side elevation showing a supporting-stand for holding the indicator. Fig. 10 are detail outline views of brackets by means of which the indicator may be held for certain classes of work.

In the drawings, A represents a casing having a removable front plate and having a curved top slotted, as shown at A′, said slot being formed parallel and adjacent the removable front and being provided along one margin with a graduated scale of any desired kind. Within this casing is pivotally mounted angled arm B, arranged in the lower portion of the casing, and in one side of the casing substantially in the same horizontal plane as the pivot-point of the arm B and in the bottom of the casing in a vertical plane with said pivot-point are formed openings $A^2$. Pins B′ and $B^2$ are secured by means of suitable reduced threaded portions in the ends of the members of the angled arm B, and these pins extend outwardly through the opening $A^2$, the pin B′ working in the side opening and the pin $B^2$ projecting downwardly through the bottom opening. These openings are of greater length than the diameters of those portions of the pins passing through the openings, so that the pins can play in said openings when the arm B is rocked upon its pivot-point.

At the outer end of the pin B′ is formed a socket $B^3$, into which may be threaded a point G, which is provided with a milled nut G′, by means of which the pointer G may be readily placed in position or removed. Within the casing A is also pivoted at a point adjacent the arm B a lever C, the lower end of which rests adjacent the depending member of the angled arm B and in position to be engaged by said arm upon its slightest movement. In the upper portion of the casing A is pivoted a lever D, which adjacent its pivotal point is provided with a nose D′, which nose carries a roller $D^2$, normally in engagement with the upper end of the lever C. A tapering index handle or needle E is pivoted at its lower end to the lower portion of the casing A, and its point or free end projects into the slot A′ and is adapted to swing back and forth in the said slot. The needle E adjacent its lower end carries a pin E′, which is engaged by the lower end portion of the lever D. A leaf-spring F is secured in the upper left-hand corner of the casing A and extends downwardly and diagonally, and its free end portion bears also upon the pin E′ and upon the side of the pin opposite the lever D, and this spring tends to return the needle and other movable parts to their normal position and to hold them therein.

Upon the back of the casing A is formed or otherwise secured a disk H, upon which is secured a plate H′ in the form of a disk having a quarter-segment cut therefrom, thereby providing two radial shoulders $H^2$, which are undercut by means of grooves $H^3$, and at the meeting ends of these grooves is formed a socket $H^4$, said socket being of course in the center of the disk H. A bar J is provided with a reduced portion J′, which is adapted to lie in the grooves $H^3$ and which carries a ball J², adapted to rotate in the socket H⁴, thereby securing the bar J to the casing A by means of a ball-and-socket joint, the grooves H³ forming locking means for locking the bar in its adjusted position when throwing into either a vertical plane or a horizontal plane at right angles to the casing A, as shown in Fig. 2. I form also a holder for the bar J, consisting of a base-plate K and a top plate K', which plates are provided with longitudinal V-shaped grooves K², formed in their opposing faces. The base-plate K adjacent its rear end is transversely slotted, as shown at K³; and the two plates are held together by an angled yoke L, the top of which rests upon the top of the upper plate K', to which its side members are secured, and these side members embrace the sides of the base-plate K and are connected by a pin L', which passes through and is capable of vertical movement in the slot K³.

In Fig. 1 I have shown the indicator with the bar J held in the holder formed by the plates K and K', the said holder being held in a lathe-post M. In Fig. 9 I have shown a stand for supporting the indicator when used with certain classes of work, which stand consists of a base N, provided with a post N'. A standard O is pivotally connected to the post N' and is locked in its adjusted position by a set-screw O', and the post carries adjacent its upper end a perforated and slit lug O², in which the bar J may be clamped by means of a thumb-nut O³.

In Fig. 10 I have shown a supporting-bracket P in two positions, by means of which the indicator may be supported when the indicator is used with a surface-gage, drill-press, or the like.

The operation of the device will be readily understood, and it will also be obvious that it can be coupled up for testing both horizontal and vertical plane surfaces, and when any unevenness of the surface being tested is presented to the pins B' or B² or to the pointer G the angled arm B will be rocked upon its pivotal point, thus moving the lever C, which in turn will depress the nose D' of the lever D, and as this lever bears upon the pin E', carried by the needle E, the needle will be forced along the slot and the extent of the inequality upon the surface will be indicated by means of the scale.

Having now described my invention, what I claim as new, and desire to secure by Letters Patent, is—

1. A device of the kind described comprising an indicating-needle, an angled arm, a lever adapted to be actuated upon movement of the angled arm, a second lever having a nose in engagement with an end of the first-mentioned lever, and a pin carried by the needle adapted to be engaged by the free end of the second-mentioned lever.

2. A device of the kind described, comprising a casing having a slot along its upper face and side and bottom openings, a pivoted needle movable along the slot, a pivoted angled arm, pins carried by the arm and projecting respectively through the side and bottom openings and adapted to have play therein, and means for communicating the movement of the angled arm to the needle.

3. A device of the kind described, comprising a casing having a slotted top, a scale being formed along the margin of said slot, a pivoted needle having its point movable in the slot, the said casing having an opening in one side and an opening in the bottom, an angled arm pivoted within the casing, pins carried by the members of said arm, said pins projecting outwardly through the openings in the side and bottom respectively, the length of said openings being greater than the diameter of the pins at the point of passage, and a plurality of pivoted levers actuated by the rocking of the angled arm and adapted to actuate the pivoted needle.

4. A device of the kind described, comprising a casing, an indicating-needle pivotally carried by the casing, an angled arm pivotally carried by the casing, said arm being adapted to be rocked by projections upon a tested surface, and means whereby a rocking of the arm will move the needle, and a bar connected by a ball-and-socket joint to one side of said casing.

5. A device of the kind described comprising a casing, an indicating-needle carried thereby, means for moving said needle, a segmental disk carried by the rear face of the casing and having a ball-socket centrally formed therein, undercut radial shoulders formed on the said disk, and a supporting-bar having a portion adapted to rest under said shoulders and provided with a spherical head adapted to rotate in said socket.

6. A device of the kind described, comprising a casing having an indicating-needle pivotally carried thereby, and having openings formed therein, an angled arm pivoted in the casing, projecting pins carried by the said arm, said pins extending through the said openings and adapted to move along said openings, a pivoted lever having one end in engagement with a member of said arm, a second pivoted lever having a nose adjacent its pivotal point, a roller carried by said nose and in engagement with the other end of the first-mentioned lever, a pin carried by the needle adapted to be engaged by the second-mentioned lever, and a spring adapted to return and hold the parts in their normal position.

JACOB SIGRIST.

Witnesses:
EDWARD WALLIN,
HARRY J. DALZELL.